US010303988B1

(12) United States Patent
Long et al.

(10) Patent No.: US 10,303,988 B1
(45) Date of Patent: May 28, 2019

(54) VISUAL SEARCH METHODS AND SYSTEMS (71) Applicant: Digimarc Corporation, Beaverton, OR (US)

(72) Inventors: Scott M. Long, Portland, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/237,110

(22) Filed: Aug. 15, 2016

Related U.S. Application Data (60) Provisional application No. 62/205,545, filed on Aug. 14, 2015, provisional application No. 62/216,639, filed on Sep. 10, 2015.

(51) Int. Cl.
*G06K 9/68* (2006.01)
*H04N 1/00* (2006.01)
(Continued)

(52) U.S. Cl.
CPC ....... *G06K 9/6857* (2013.01); *G06K 9/00577* (2013.01); *G06K 9/6267* (2013.01);
(Continued)

(58) Field of Classification Search
CPC ... G06T 1/0021; G06T 1/0028; G06T 1/0057; G06T 1/0064; G06T 1/0092;
(Continued)

(56) References Cited

U.S. PATENT DOCUMENTS 6,122,403 A 9/2000 Rhoads
6,345,104 B1 2/2002 Rhoads
(Continued)

OTHER PUBLICATIONS

L. Luo, Z. Chen, M. Chen, X. Zeng, & Z. Xiong, "Reversible Image Watermarking Using Interpolation Technique", 5 IEEE Transactions on Info. Forensics & Sec. 187-193 (Mar. 2010) (Year: 2010).*
(Continued)

*Primary Examiner* — David N Werner
(74) *Attorney, Agent, or Firm* — Digimarc Corporation (57) ABSTRACT

Certain aspects of the present technology involve automated capture of several image frames (e.g., simultaneously in a single exposure, or in a burst of exposures), and application of a data-extraction process (e.g., watermark decoding) to each such image. Other aspects of the technology involve capturing a single scene at two different resolutions, and submitting imagery at both resolutions for watermark decoding. Still other aspects of the technology involve increasing the signal-to-noise ratio of a watermark signal by subtracting one image from another. Yet other aspects of the technology involve receiving focus distance data from a camera, and employing such data in extracting information from camera imagery. Smartphone camera APIs can be employed to simplify implementation of such methods. A great number of features and arrangements are also detailed. Embodiments of such technology can simplify image processing required for data extraction, with attendant reductions in required program memory and battery power consumption. Moreover, they can enlarge a system's operational envelope—enabling information to be extracted from imagery under conditions that lead to failure in prior art arrangements.

20 Claims, 6 Drawing Sheets

```
// Step 1: Create two ImageReader instances capturing at two different resolutions // Capture images at lower resolution
lowResReader = ImageReader.newInstance(640, 480, ImageFormat.YUV_420_888, NUM_IMAGE_BUFFERS);

// Capture images at higher resolution
hiResReader = ImageReader.newInstance(1600, 1200, ImageFormat.YUV_420_888, NUM_IMAGE_BUFFERS);

// Step 2: Start the camera, passing both reader surfaces to it

// ... open the camera as "cam" ... (placeholder)
cam = OpenCamera();

// Set up a list containing both surfaces
List<Surface> surfaces = new List<Surface>();
surfaces.add(lowResReader);
surfaces.add(hiResReader);

// Start a capture session
cam.createCaptureSession(surfaces, sessioncb, mCamHandler);

// Step 3: Send capture requests
```

(51) Int. Cl.
  *G06K 9/00* (2006.01)
  *H04N 1/387* (2006.01)
  *H04N 5/232* (2006.01)
  *G06T 1/00* (2006.01)
  *G06K 9/62* (2006.01)
  *G06T 11/60* (2006.01)
  *H04N 19/467* (2014.01)
  *H04N 19/44* (2014.01)
  *G06T 3/40* (2006.01)

(52) U.S. Cl.
  CPC .......... *G06T 1/0092* (2013.01); *G06T 3/4053* (2013.01); *G06T 11/60* (2013.01); *H04N 1/0087* (2013.01); *H04N 1/0088* (2013.01); *H04N 1/00846* (2013.01); *H04N 1/00848* (2013.01); *H04N 1/00867* (2013.01); *H04N 1/3871* (2013.01); *H04N 5/23232* (2013.01); *H04N 19/44* (2014.11); *H04N 19/467* (2014.11); *G06K 2009/0059* (2013.01); *G06T 2201/005* (2013.01); *G06T 2207/20224* (2013.01)

(58) Field of Classification Search
  CPC ............... G06K 9/6857; G06K 9/0057; G06K 2009/0059; H04N 1/00846; H04N 1/00848; H04N 1/00867; H04N 1/0087; H04N 1/0088
  See application file for complete search history.

(56) References Cited

U.S. PATENT DOCUMENTS

| | | | |
|---|---|---|---|
| 6,424,725 B1 | 7/2002 | Rhoads et al. | |
| 6,442,284 B1 | 8/2002 | Gustafson et al. | |
| 6,516,079 B1 | 2/2003 | Rhoads | |
| 6,590,996 B1 | 7/2003 | Reed et al. | |
| 6,661,454 B1* | 12/2003 | Hwang | H04N 5/772 348/231.1 |
| 6,738,092 B1* | 5/2004 | Nakagawa | G11B 5/5582 348/231.2 |
| 6,912,295 B2 | 6/2005 | Reed et al. | |
| 6,937,997 B1* | 8/2005 | Parulski | G06Q 20/204 705/17 |
| 6,947,571 B1 | 9/2005 | Rhoads et al. | |
| 6,988,202 B1 | 1/2006 | Alattar | |
| 7,013,021 B2 | 3/2006 | Gustafson | |
| 7,076,082 B2 | 7/2006 | Sharma | |
| 7,206,820 B1 | 4/2007 | Rhoads | |
| 7,231,061 B2 | 6/2007 | Bradley | |
| 7,346,184 B1 | 3/2008 | Carr et al. | |
| 7,397,607 B2 | 7/2008 | Travers | |
| 7,574,014 B2 | 8/2009 | Sharma et al. | |
| 7,978,875 B2 | 7/2011 | Sharma et al. | |
| 9,020,295 B1 | 4/2015 | Elancheralathan | |
| 9,043,349 B1 | 5/2015 | Lin et al. | |
| 9,058,644 B2 | 6/2015 | Ramos et al. | |
| 9,819,950 B2 | 11/2017 | Boles et al. | |
| 10,007,964 B1 | 6/2018 | Calhoon et al. | |
| 2002/0036702 A1* | 3/2002 | Ohnogi | H04N 1/0044 348/333.05 |
| 2002/0048413 A1* | 4/2002 | Kusunoki | H04N 1/00132 382/282 |
| 2003/0052986 A1* | 3/2003 | Matsumoto | H04N 1/00442 348/333.05 |
| 2005/0195128 A1 | 9/2005 | Sefton | |
| 2006/0219789 A1 | 10/2006 | Epshteyn | |
| 2008/0219503 A1* | 9/2008 | Di Venuto | G06K 9/00577 382/103 |
| 2009/0244097 A1 | 10/2009 | Estevez | |
| 2009/0322671 A1 | 12/2009 | Scott et al. | |
| 2010/0045869 A1 | 2/2010 | Baseley et al. | |
| 2010/0150434 A1 | 6/2010 | Reed | |
| 2010/0188512 A1 | 7/2010 | Simske et al. | |
| 2011/0034176 A1 | 2/2011 | Lord et al. | |
| 2011/0135160 A1* | 6/2011 | Sagan | G06K 9/00577 382/108 |
| 2011/0161076 A1 | 6/2011 | Davis et al. | |
| 2011/0212717 A1 | 9/2011 | Rhoads et al. | |
| 2011/0316876 A1 | 12/2011 | Kindberg et al. | |
| 2012/0078989 A1 | 3/2012 | Sharma et al. | |
| 2012/0129574 A1 | 5/2012 | Reed et al. | |
| 2012/0162457 A1 | 6/2012 | Veeraraghavan et al. | |
| 2012/0208592 A1 | 8/2012 | Davis et al. | |
| 2012/0258776 A1 | 10/2012 | Lord et al. | |
| 2013/0217440 A1 | 8/2013 | Lord et al. | |
| 2013/0223673 A1 | 8/2013 | Davis et al. | |
| 2013/0242054 A1 | 9/2013 | Chiu et al. | |
| 2013/0308045 A1 | 11/2013 | Rhoads et al. | |
| 2013/0311329 A1 | 11/2013 | Knudson et al. | |
| 2014/0052555 A1 | 2/2014 | MacIntosh et al. | |
| 2014/0057676 A1 | 2/2014 | Lord et al. | |
| 2014/0198240 A1 | 7/2014 | Rhoads | |
| 2014/0304122 A1 | 10/2014 | Rhoads et al. | |
| 2014/0357312 A1 | 12/2014 | Davis et al. | |
| 2015/0016712 A1 | 1/2015 | Rhoads et al. | |
| 2015/0030201 A1 | 1/2015 | Holub et al. | |
| 2015/0278980 A1 | 10/2015 | Sinclair et al. | |
| 2016/0063611 A1 | 3/2016 | Davis et al. | |

OTHER PUBLICATIONS

Digimarc Corp., "Digimarc for Images Best Practices Guide (Chroma + Classic Ed.)" (2010) (Year: 2010).*
A. Reed, T. Filler, K. Falkenstern, Y. Bai, "Watermarking Spot Colors in Packaging", presented at 2015 IS&T/SPIE Elctronic Imaging Conference (Feb. 8, 2015).*
Google Android hardware developer spec for Camera2 framework, printed Aug. 14, 2015.
Camera2 API on MWC 2015 devices: Galaxy S6, HTC One M9 and more Lollipop devices, Spectrastudy web site, Mar. 2015.
Camera2 and You: Leveraging Android Lollipop's New Camera, Willowtreeapps web site, May 8, 2015.

* cited by examiner

FIG. 1

```
// Step 1: Create two ImageReader instances capturing at two different resolutions // Capture images at lower resolution
lowResReader = ImageReader.newInstance(640, 480, ImageFormat.YUV_420_888, NUM_IMAGE_BUFFERS);

// Capture images at higher resolution
hiResReader = ImageReader.newInstance(1600, 1200, ImageFormat.YUV_420_888, NUM_IMAGE_BUFFERS);

// Step 2: Start the camera, passing both reader surfaces to it
// ... open the camera as "cam" ... (placeholder)
cam = OpenCamera();

// Set up a list containing both surfaces
List<Surface> surfaces = new List<Surface>();
surfaces.add(lowResReader);
surfaces.add(hiResReader);

// Start a capture session
cam.createCaptureSession(surfaces, sessioncb, mCamHandler);

// Step 3: Send capture requests
```

FIG. 2A

```
// Example request 1: low res, short focal distance

CaptureRequest.Builder builder = cam.createCaptureRequest(CameraDevice.TEMPLATE_PREVIEW);
// Add the low res target surface
builder.addTarget(lowResReader);
// Set focus distance to 6 inches
builder.set(CaptureRequest.LENS_FOCUS_DISTANCE, 6.56f); // 6.56 diopters ~= 6 inches
// Set the autofocus mode to "continuous picture."
builder.set(CaptureRequest.CONTROL_AF_MODE, CaptureRequest.CONTROL_AF_MODE_CONTINUOUS_PICTURE);
// Build the actual CaptureRequest object
CaptureRequest req = builder.build();
// Create a CaptureCallback which will receive callbacks when each frame is captured. Since this
// is an example, we don't really care to be informed when a frame is captured, so we leave this
// callback empty.
CameraCaptureSession.CaptureCallback capcb = new CameraCaptureSession.CaptureCallback() {
};
// Start the request. When the image has been captured, the ImageReader surface will receive a callback
// and we can process the frame.
captureSession.capture(req, capcb, null);
```

FIG. 2B

```
// Example request 2: hi res, short focal distance
CaptureRequest.Builder builder = cam.createCaptureRequest(CameraDevice.TEMPLATE_PREVIEW);
// Add the low res target surface
builder.addTarget(hiResReader);
// Set focus distance to 4 inches
builder.set(CaptureRequest.LENS_FOCUS_DISTANCE, 6.56f); // 6.56 diopters ~= 6 inches
// Set the autofocus mode to "continuous picture."
builder.set(CaptureRequest.CONTROL_AF_MODE, CaptureRequest.CONTROL_AF_MODE_CONTINUOUS_PICTURE);
// Build the actual CaptureRequest object
CaptureRequest req = builder.build();
// Create a CaptureCallback which will receive callbacks when each frame is captured. Since this
// is an example, we don't really care to be informed when a frame is captured, so we leave this
// callback empty.
CameraCaptureSession.CaptureCallback capcb = new CameraCaptureSession.CaptureCallback() {
};
// Start the request. When the image has been captured, the ImageReader surface will receive a callback
// and we can process the frame.
captureSession.capture(req, capcb, null);
```

FIG. 2C

```
// Example request 3: low res, long focal distance
CaptureRequest.Builder builder = cam.createCaptureRequest(CameraDevice.TEMPLATE_PREVIEW);
// Add the low res target surface
builder.addTarget(lowResReader);
// Set focus distance to 15 feet
builder.set(CaptureRequest.LENS_FOCUS_DISTANCE, 1.64f); // 1.64 diopters ~= 2 feet
// Set the autofocus mode to "continuous picture."
builder.set(CaptureRequest.CONTROL_AF_MODE, CaptureRequest.CONTROL_AF_MODE_CONTINUOUS_PICTURE);
// Build the actual CaptureRequest object
CaptureRequest req = builder.build();
// Create a CaptureCallback which will receive callbacks when each frame is captured. Since this
// is an example, we don't really care to be informed when a frame is captured, so we leave this
// callback empty.
CameraCaptureSession.CaptureCallback capcb = new CameraCaptureSession.CaptureCallback() {
};
// Start the request. When the image has been captured, the ImageReader surface will receive a callback
// and we can process the frame.
captureSession.capture(req, capcb, null);
```

FIG. 2D

```
// Example request 4: hi res, long focal distance
CaptureRequest.Builder builder = cam.createCaptureRequest(CameraDevice.TEMPLATE_PREVIEW);
// Add the low res target surface
builder.addTarget(hiResReader);
// Set focus distance to 15 feet
builder.set(CaptureRequest.LENS_FOCUS_DISTANCE, 1.64f); // 1.64 diopters ~= 2 feet
// Set the autofocus mode to "continuous picture."
builder.set(CaptureRequest.CONTROL_AF_MODE, CaptureRequest.CONTROL_AF_MODE_CONTINUOUS_PICTURE);
// Build the actual CaptureRequest object
CaptureRequest req = builder.build();
// Create a CaptureCallback which will receive callbacks when each frame is captured. Since this
// is an example, we don't really care to be informed when a frame is captured, so we leave this
// callback empty.
CameraCaptureSession.CaptureCallback capcb = new CameraCaptureSession.CaptureCallback() {
};
// Start the request. When the image has been captured, the ImageReader surface will receive a callback
// and we can process the frame.
captureSession.capture(req, capcb, null);
```

FIG. 2E

VISUAL SEARCH METHODS AND SYSTEMS

RELATED APPLICATION DATA

This application claims priority to provisional applications 62/205,545, filed Aug. 14, 2015, and 62/216,639, filed Sep. 10, 2015, the disclosures of which (including appended materials) are incorporated herein by reference.

TECHNICAL FIELD

The present technology concerns image processing, and more particularly concerns automated recognition of image contents, e.g., for visual search purposes.

Background and Introduction

Smartphones and other portable devices are increasingly utilized to perform visual search. One example is applicant's Digimarc Discover app, which captures imagery from a retail product, decodes any watermark- or barcode-encoded data, and uses extracted identification data to access product information. Another is the Google Translate app, which performs text recognition on smartphone-captured imagery, and translates the recognized text into a different language.

To increase user convenience, and limit battery consumption, it is important that such apps work quickly and reliably—extracting information from the imagery on the first user attempt.

One approach to assuring reliability is to apply several different decoding attempts to a single frame of captured imagery. For example, a watermark decoder can try several different image counter-distortions in order to find one that yields valid output data. (Such an arrangement is disclosed in patent publication 20130223673, in the context of reading a watermark from a partially-occluded curved surface, and in patent application Ser. No. 15/152,365, filed May 11, 2016 (now U.S. Pat. No. 10,007,964), in the context of reading a watermark from a package from an unknown distance.) Similarly, in text recognition, several different optical character recognition engines can be employed, each reporting a respective level of confidence in its results. The result associated with the highest confidence is then used as the process output data. (Such an arrangement is disclosed in U.S. Pat. No. 9,043,349.)

Another approach is to identify a low quality portion of an image frame, and to enhance it prior to applying a data extraction process. (Such arrangements are disclosed in U.S. Pat. Nos. 9,020,295 and 9,058,644.) A related approach is to identify a low quality portion of one image frame, and to replace it with a higher quality portion of a different image frame before performing data extraction. (Such an arrangement is disclosed in U.S. Pat. No. 7,346,184.)

Rather than applying several alternative detectors (or alternative detection parameters) to an image frame, and rather than attempting to recognize and correct low quality portions of an image before performing data extraction, certain aspects of the present technology involve automated capture of several image frames (e.g., simultaneously in a single exposure, or in a burst of exposures captured within one second, and more commonly within a fifth of a second), and application of a common data-extraction process (e.g., watermark decoding) to each such image.

Other aspects of the present technology involve capturing a single scene at two different resolutions, and submitting imagery at both resolutions for watermark decoding.

Still other aspects of the present technology involve increasing the signal-to-noise ratio of a watermark signal by subtracting one image from another.

Yet other aspects of the present technology involve receiving focus distance data from a camera, and employing such data in extracting information from camera imagery.

Certain embodiments employing these and other aspects of the technology simplify the image processing required for data extraction, with attendant reductions in required program memory and battery power consumption. Moreover, they can enlarge the system's operational envelope—enabling information to be extracted under conditions that lead to failure in prior art arrangements The foregoing and other aspects of the present technology will be more readily apparent from the following detailed description, which proceeds with reference to the accompanying drawings.

DETAILED DESCRIPTION

Figure 1:
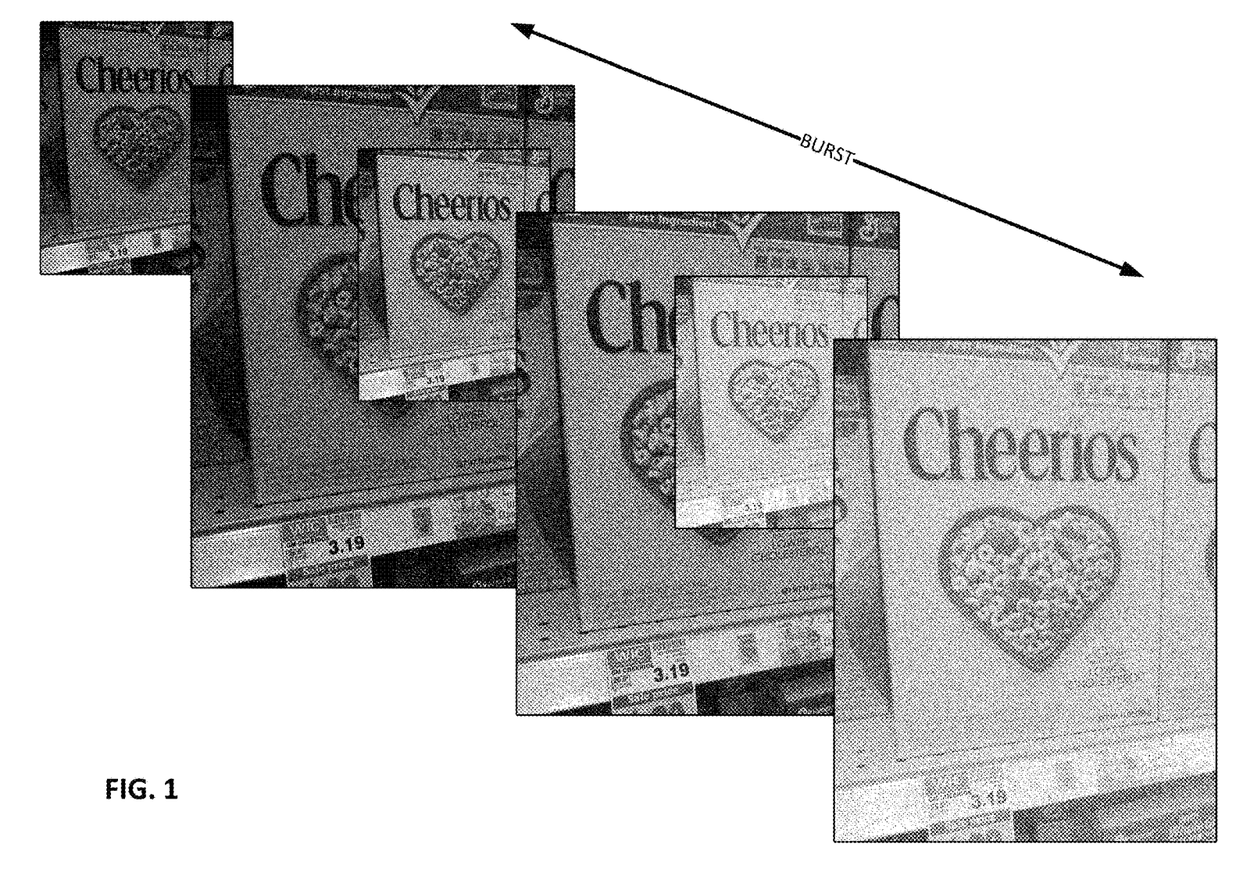
FIG. 1 schematically depicts a burst of six different images depicting a scene.

In accordance with one aspect of the technology, a camera-equipped user device captures a burst of image frames. Each frame depicts the same scene, but different frames are captured with different camera settings/parameters. For example, two frames in the burst may be characterized by different lens apertures. And/or different focal distances. And/or different image sizes (resolutions). And/or different ISO gains. Etc. Such a burst is illustrated in FIG. 1, depicting a box of cereal on a supermarket shelf (e.g., as may be captured by a shopper).

A watermark detector in the device processes image frames captured in this burst. Due to the different camera settings, watermark data may be successfully extracted from certain of the image frames, but not others. When watermark data is successfully decoded, the device uses the decoded data to present a response to the user. For example, watermark data decoded from imagery of a cereal box may be used to access a record in a remote database that provides nutritional information about the cereal. Such information is then presented to the user, on the device display.

Desirably the burst has a duration of one second or less, and more typically has a duration of less than 0.5, 0.2, or 0.1 seconds. Although the burst can include an arbitrary number of frames, capture of between 2 and 10 frames in a burst is typical. (Capture rates of 30—and sometimes 60—frames per second may be used.)

The burst may be triggered by a user action, such as a command issued through a user interface. One suitable command is a gesture made with a smartphone, in which the phone is moved in a first direction, from an initial position to an imaging position. After pausing a few tenths of a second at the imaging position, the phone is moved back in a second direction opposite to the first. Such gesture, and its detection, are more fully detailed in application 20140198240, as a "motion-stasis-motion" camera gesture.

In other arrangements, the burst is not triggered by a user action. Rather, bursts of image frames are repeatedly captured in looped fashion, akin to video capture. The user device cycles, capturing successive bursts of imagery—which are processed as described herein.

In an exemplary embodiment, each burst includes four frames (e.g., characterized by the four different combinations of two different focus distances and two different lens apertures). The result is a sequence of frames 1, 2, 3, 4, 5, 6, 7, 8, 9, 10, etc., where frames 1, 5 and 9 are captured with a common set of parameters, and frames 2, 6, and 10 are captured with a common set of parameters—but different than frames 1, 5 and 9.

This looping mode may be activated based on context, e.g., by sensing that the user has removed a smartphone from a pocket or purse, and is holding the phone nearly stationary, away from the body, so that its principle plane is within 20 degrees of horizontal or vertical—suggesting a deliberate pose intended for image capture. (Motion and position sensors in the phone provide data by which such context can be sensed.)

Application 20130217440 details a camera that is responsive to setup commands specifying a variety of capture parameters, such as the size of the image frame, length of the exposure, aperture size, and lens focus.

Google has recently provided such programmatic camera control as a feature of its Android operating system software, by its Camera2 framework, including associated APIs. The Camera2 framework also includes commands (in the DngCreator class) specifying that the frame of data should be stored in a RAW format (in the DNG file format), i.e., without the color filter interpolation that is commonly used. The Camera2 framework also allows automatic white balance, automatic focus, automatic exposure, and noise reduction, to be selectively enabled or disabled. The Google Nexus 6 smartphone is among the phones that fully supports the Camera2 APIs.

(Documentation for the Camera2 framework is attached to application 62/205,545 and forms part of the present specification. Additional information is publicly available online.)

While the Camera2 API supports capture of frames of different sizes, this is done differently than in the arrangement detailed in publication 20130217440. In the latter arrangement, a single frame—of specified pixel dimensions—is output per exposure. So two exposures are executed to yield two differently-sized images. In the Camera2 arrangement, in contrast, a single exposure (gathering light onto a single imaging sensor via a single optic path) can be directed to two or more output targets, i.e., different memories ("surfaces")—each characterized by different pixel dimensions. Thus, a single exposure can produce one frame at 640×480 resolution, and another frame of the same scene at 2560×1920 resolution.

In accordance with another aspect of the technology, a single such capture is performed to yield two or more differently-sized versions of the image. A watermark decoding operation is applied to the first version, yielding first results, and a watermark decoding operation is also applied to the second version, yielding second results. The watermark decoder recovers CRC data from the encoded payload, allowing the device to determine which decoding operation (or both) yields corrects correct decoded data. Again information based on such results is presented to the user.

Such arrangement is advantageous because the watermark decoder presumes that the watermark it is looking for has a certain scale in the image. (Most decoders are robust over a range of scale states, e.g., 50-200% of a target scale.) Storing the image capture at two different resolutions is akin to changing the image's scale state (or capturing at two different imaging distances). Watermark data that is unreadable at one scale state may be successfully extracted at the other scale state.

Programmatic control over capture parameters also enhances approaches known from the prior art, in which two or more images are composited together, to yield an enhanced hybrid image. For example, plural images can be captured with different exposures, and combined to yield a high dynamic range (HDR) image. A single watermark decoding operation (or barcode decoding, or OCR operation) can be applied to the single enhanced image, with advantageous effects.

In another arrangement, two frames are captured—with different camera settings. A first region in the first image frame is identified as having a higher probability of watermark detection than a corresponding region in the second image frame. Conversely, a second region in the second image frame is identified as having a higher probability of watermark detection than a corresponding region in the first image frame. (Methods for identifying regions of higher watermark decoding probability are identified in documents identified below.) A composite image is generated that includes the first region of the first image frame, and the second region of the second image frame. A watermark decoding process is then applied to this hybrid image.

Rather than adding part of one image to another, advantages can be achieved by subtracting part (or all) of an image from another.

In the case of cereal box artwork that has been encoded with digital watermark data, the encoding takes the form of high spatial frequency, low amplitude variations in the luminance, or chrominance of the artwork. The artwork is a host signal in which the watermark data has been embedded, but this host signal acts as noise to the watermark signal. Its presence makes decoding the watermark signal more difficult. Accordingly, watermark decoders commonly attempt to attenuate the host signal before decoding the high spatial frequency, low amplitude, watermark signal. Various filtering arrangements, such as median filtering and "oct-axis" filtering, are employed.

In accordance with a further embodiment of the technology, a host artwork signal is attenuated from a first image frame by subtracting a second image frame. The second image frame is captured, or processed, to reduce its high spatial frequency signal components. This second image frame thus has the same host artwork signal component, but its watermark signal component is reduced. Subtracting the second image from the first image thus tends to cancel the host artwork signal, while leaving the watermark signal component mostly intact—leading to a substantial increase in the signal-to-noise ratio of the watermark signal.

One way to generate such a second image frame is to capture it at lower resolution. While the first image may be captured at a resolution of 2560×1920 pixels, the second image may be captured at a resolution of 640×480 pixels. This latter format does not allow for high fidelity capture of fine image details—the spatial frequency spectrum where the watermark signal is primarily manifested. Post-capture, the second frame can be interpolated to generate an expanded frame, of the same 2560×1920 size as the first frame. However, the interpolation does not introduce the high spatial frequency watermark signal that evaded original capture. The interpolation simply provides additional pixels having values that are intermediate their neighbors' values, by a process such as bicubic or bilinear interpolation. The interpolated 2560×1920 image frame is then subtracted from the first image frame, and a watermark decoding process is applied to the result.

Another way to generate the second image frame is through use of a "denoising" filter. Such a filter is commonly used, e.g., to remove the exposure artifacts that appear in images captured in very low light levels. These artifacts are due to thermal shot noise and other device phenomena that are so small as to usually be masked, but become evident when the captured signal itself is of commensurately low amplitude.

A variety of denoising filters are in common use. Some take the form of linear smoothing filters, e.g., operating by convolving the image with a mask representing a low-pass (slight blur) filter. Others are anisotropic filters, which vary the filtering function based on image content, typically with blurring that is reduced along edge contours.

Image denoising is one of the operations provided in the Camera2 framework. Thus, the camera can be instructed to output two frames from a single exposure—one to which denoising has been applied, and one without such processing. The former is subtracted from the latter, yielding an image frame in which the high spatial frequency digital watermark signal is effectively emphasized. Again, this difference signal is applied to the watermark detector.

(While, in both of the foregoing examples, use of a single exposure to generate both the first and second frames is preferred, it is not necessary. The camera can capture two exposures of the same scene: one with reduced resolution—or denoising—and one without. The two frames can then be processed, as above, to yield a difference frame that is submitted to the digital watermark detector.)

The just-reviewed filtering-by-subtraction arrangements process a pair of frames to provide a single image frame from which watermark data is decoded. Plural such subtraction-based image frames can be produced at different camera settings, and combined to yield an enhanced, hybrid frame for watermark decoding (or they can be separately, sequentially, processed by a watermark decoder).

In one hybrid frame arrangement, a subtraction-based image frame is based on one pair of image captures with a short exposure, and one pair with a long exposure. A local contrast map is computed for each subtraction-based image frame—showing the maximum pixel value variation within a small neighborhood around each pixel, such as within a distance of 1, 2, 3, 5 or 10 pixels. (High local contrast tends to positively correlate with watermark signal strength.) A hybrid image is then produced—combining the regions of highest local contrast from each subtraction-based image, and this resulting hybrid image frame is then submitted to the watermark detector.

(The longer exposure is typically at least twice the length of the shorter. Ratios greater than 2:1 are more common, e.g., 4:1, or even 10:1.)

Relatedly, a first such subtraction-based image frame can be captured with a shorter focus distance (e.g., six inches), and a second subtraction-based image frame can be captured with a longer focus distance (e.g., two feet). A sharpness map is computed for each image (e.g., by local contrast metrics), and a hybrid image is produced that combines the sharpest regions from each image. Again, watermark detection is applied to the result.

FIGS. 2A-2E detail exemplary Camera2 Java code for capturing two such pairs of images: a first low/high resolution pair (640×480 pixels; 1600×1200 pixels) captured at the shorter focal distance, and a second low/high resolution pair captured at the longer focal distance. (The Camera2 API uses diopters to specify lens focus distance. Diopter is the reciprocal of distance measured in meters. Thus, six inches, or 0.1524 meters, is 6.56 diopters, and two feet, or 0.6096 meters, is 1.64 diopters.)

Figure 2A:
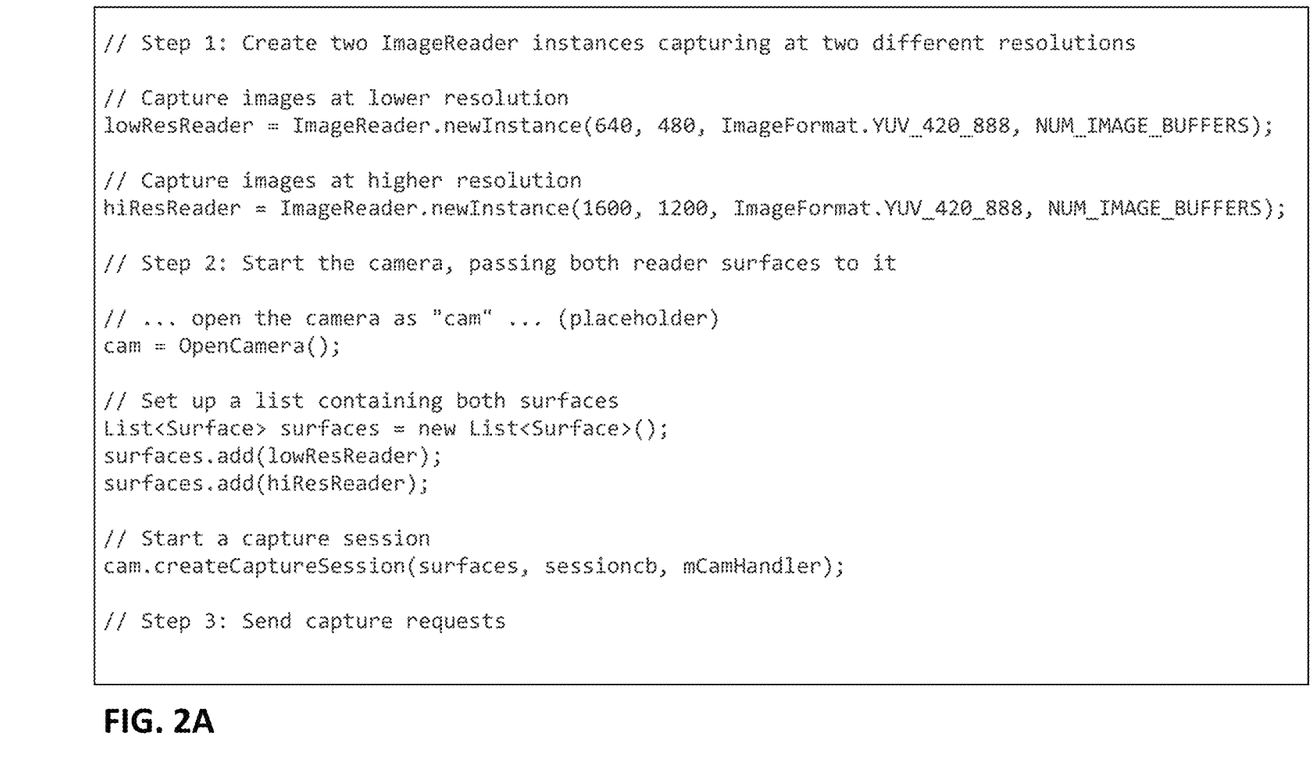
FIGS. 2A-2E detail exemplary Java code for capturing high- and low-resolution images at short and long focal distances.
Figure 2B:
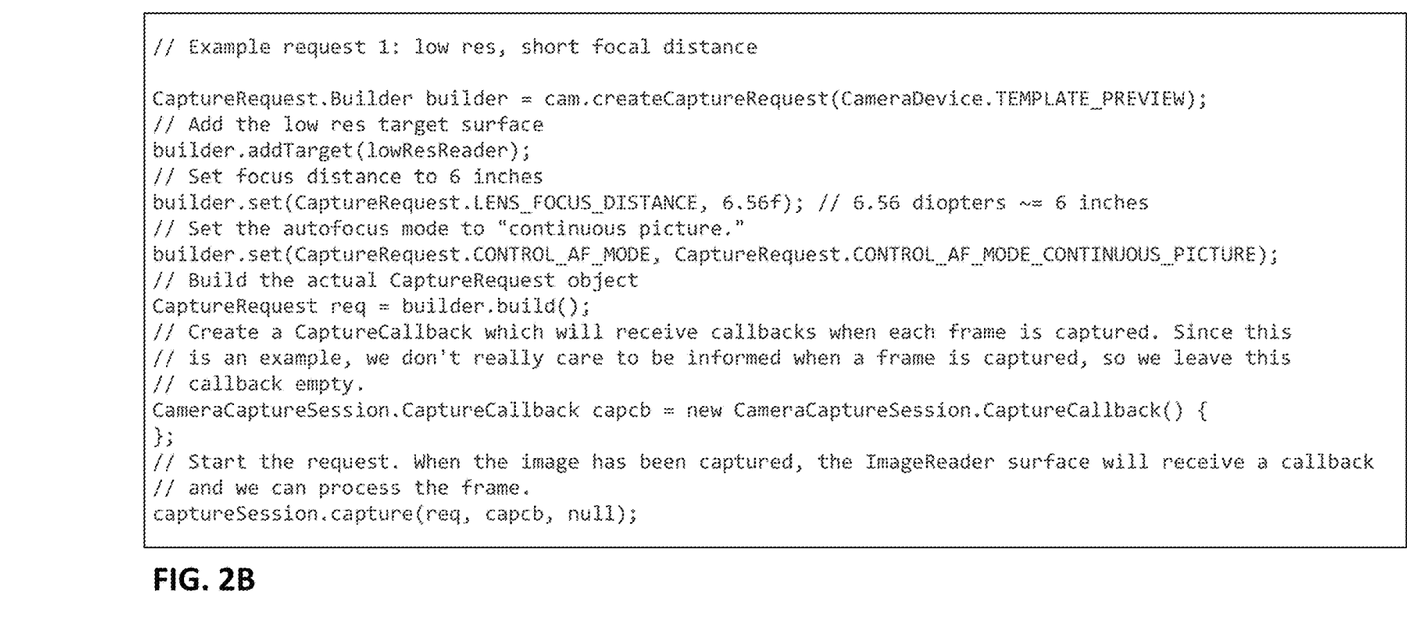
Figure 2C:
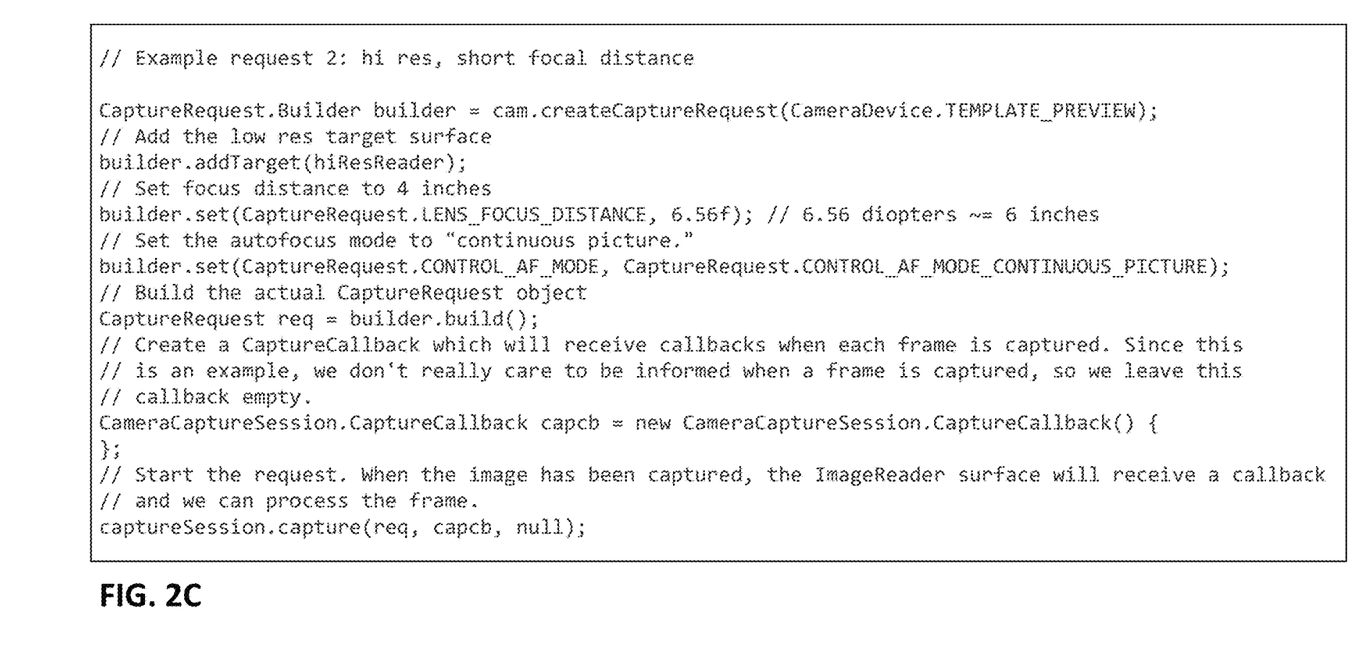
Figure 2D:
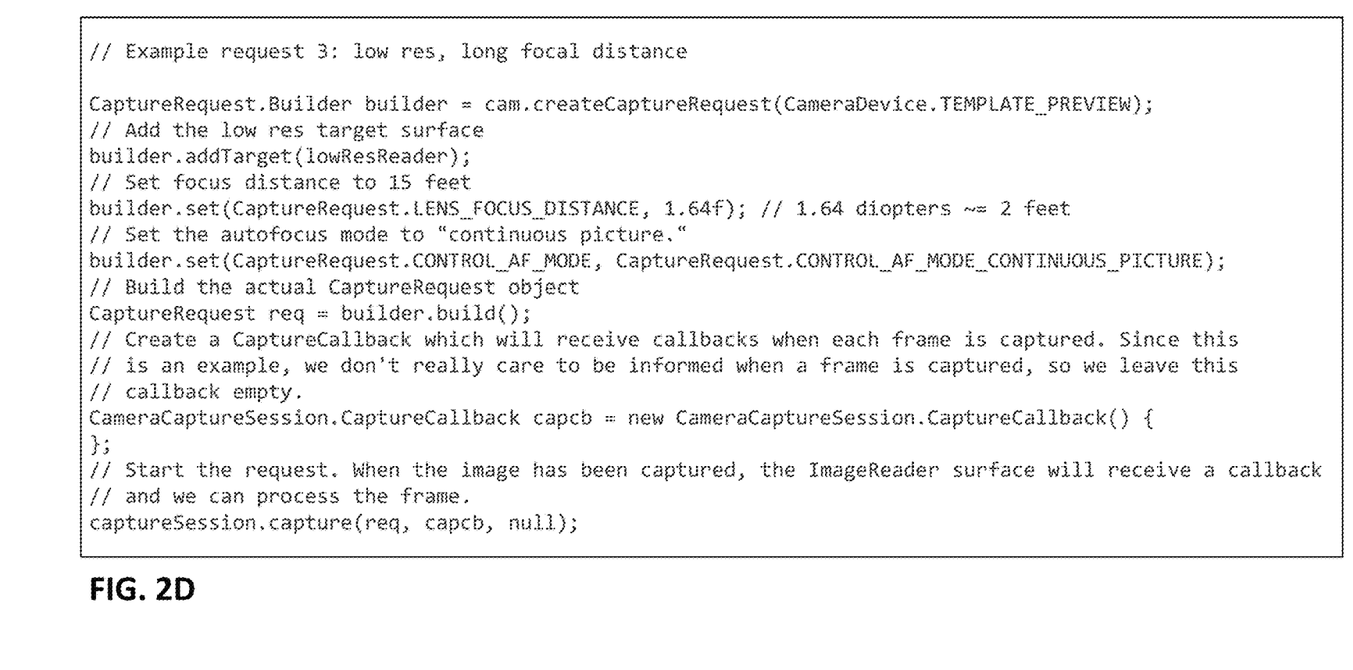
Figure 2E:
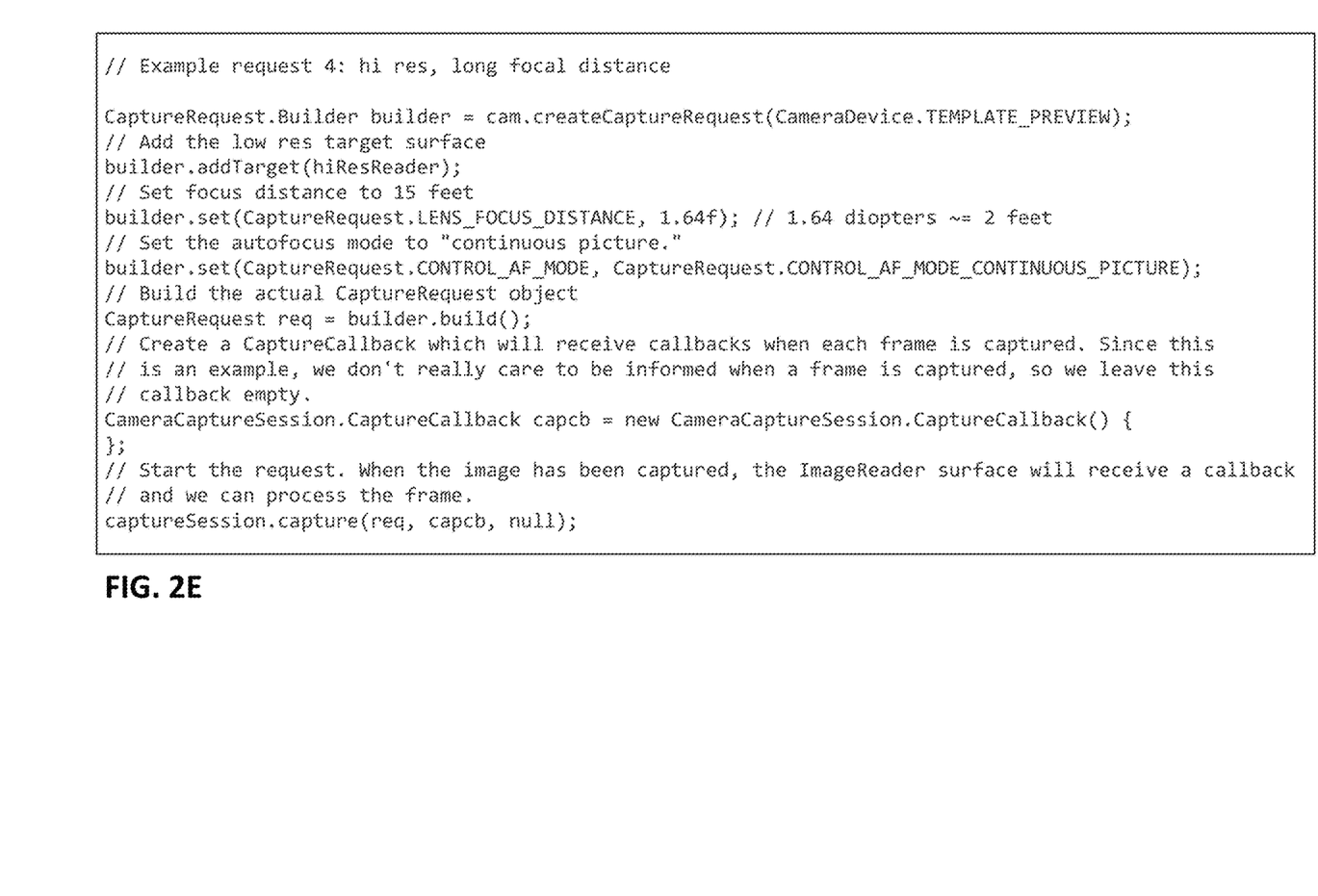

(An interval of time is required between the shorter- and longer-focal distance image captures, i.e., between the FIG. 2C and FIG. 2D code, to allow the smartphone lens adequate time to change to the requested focal length. While the focal length is still changing, the value of android.lens.state will be set to MOVING.)

Each pair of captured images is subtraction-processed, by subtracting an enlarged version of the low resolution image from the high resolution image, to mitigate/cancel the host image elements common to both. A sharpness map is computed for each resulting subtraction-based image frame. A hybrid frame is then composited, including the sharpest regions from the shorter-focus-distance subtraction-based image frame and from the longer-focus-distance subtraction-based image frame. This hybrid frame is submitted to the watermark decoder for recovery of the watermark payload.

(The longer focus distance is typically more than 8 inches, and the shorter focus distance is typically less than 12 inches, with the former being larger than the latter. The two values typically have a ratio of at least 2:1, e.g., 14 inches and 7 inches, and more commonly have a ratio around 4:1, e.g., 3 feet and 10 inches. In some embodiments, ratios greater than 4:1 can be used, e.g., infinity and 10 inches.)

While the just-described arrangements composited a hybrid image frame from two subtraction-based image frames (e.g., one at a short focus distance and one at a long focus distance), the hybrid image frame can likewise be composited from three or more subtraction-based image frames (e.g., one captured at a focus distance of six inches, another at a focus distance of two feet, and a third at a focus distance of infinity). Again, a local contrast/sharpness metric can be used to identify the component regions from the three or more frames that are most likely to include decodable watermark signals, and thus be composited together.

It will be recognized that such compositing-prior-to-watermark-decoding can also be applied to images that are not first subtraction-processed.

Similarly, it will be recognized that such compositing can draw from two or more images captured under circumstances of different focus distance and different exposure interval.

In accordance with still another aspect of the present technology, a camera provides data indicating its focus distance, and this information is used by a watermark detector as a clue to the watermark scale it should look for.

An exemplary watermark detector works best with imagery in which a single block of watermark data occupies 512×512 pixels in the captured image data. Depending on camera optics, etc., this may correspond to a focus distance of ten inches from a camera lens. If the subject (e.g., a cereal box) is instead five inches away, the block will occupy 1024×1024 pixels. Conversely, if the subject is two feet away, the block will occupy 213×213 pixels.

Cameras increasingly provide digital output data indicating the focal distance. The Camera2 API does this. Based on the reported distance (e.g., two feet)—and with knowledge of a nominal distance at which watermarked subjects are best viewed (e.g., ten inches), the captured imagery can be resized to apply a corresponding correction factor prior to submission to the watermark decoder. In the example just-given, the imagery would be enlarged (zoomed) by a factor of 512/213, or 2.4. Known interpolation techniques can be used, e.g., bicubic or bilinear.

From the foregoing, it will be recognized certain embodiments of the present technology allow successful extraction of identification information from imagery across a range of imaging conditions, including variable lighting and imaging distances. They do so in ways that are often less computationally-intense than prior techniques, thereby reducing battery power consumption. And they succeed when prior art techniques sometimes fail.

Concluding Remarks

Having described and illustrated principles of the technology with reference to certain embodiments, it should be recognized that the technology is not so-limited.

For example, while the foregoing description has focused on watermark detection, it will be recognized that the detailed arrangements can also be used advantageously in extracting information from imagery by other techniques, such as by optical character recognition (OCR), barcode decoding, and image fingerprint recognition (e.g., by SIFT, bag-of-features techniques, etc.).

Similarly, although the above examples employed a single watermark detector, e.g., to successively examine multiple frames of image data, it should be recognized that multiple watermark detectors can run simultaneously, e.g., on different cores of a multi-core processor. Thus, in a burst mode image capture, Image3 may be submitted for decoding on Core3, while Image2 is being watermark-decoded by Core2, and Core1 is outputting results from its decoding of Image1.

While the emphasis of the foregoing description has been on implementations employing smartphones, it will be recognized that this technology finds utility with all manner of devices—both portable and fixed. Devices including digital cameras, wrist- and head-mounted systems and other wearable devices can make use of the principles detailed herein. (The term "smartphone" should be construed herein to encompass all such portable devices, even those that are not telephones.) Fixed devices, too, can employ the technology, including laptops, desktops, servers and industrial equipment—such as retail point-of-sale scanners and materials handling inspection systems.

The design of such computing devices is familiar to the artisan. In general terms, each may include one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, etc.). Mobile devices are typically also equipped with a variety of motion and pose sensors (collectively referred to as motion sensors), which can include 3D accelerometers, 3D gyroscopes, and 3D magnetometers.

The arrangements detailed above can be implemented in a variety of different hardware structures, including a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular type of hardware structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of the above-detailed arrangements on a microprocessor—such as the processes for subtracting images to obtained watermark-enhanced signal frames, and compositing of frames in accordance with local image metrics—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

As noted, many microprocessors are now amalgamations of several simpler microprocessors (termed "cores"). Such arrangements allow multiple operations to be executed in parallel. (Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to perform compositing of plural image frames, and programmed tomorrow to prepare a user's tax return, an ASIC structure does not have this flexibility. Rather, an ASIC is designed and fabricated to serve a dedicated task, or limited set of tasks. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology.

(A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of the detailed algorithms offer higher performance, and consume less power, than implementations employing microprocessors. A drawback, however, is the significant time and expense required to design and fabricate circuitry that is tailor-made for one particular application.

An ASIC-based particular implementation of the above-detailed methods, e.g., for such subtracting images to obtained watermark-enhanced signal frames, and compositing of frames in accordance with local image metrics, begins by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of each of the above-detailed algorithms begins by authoring the algorithm in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed reconfigurable hardware by the Applicant, employs one or more ASIC elements. However, certain aspects of the ASIC operation can be reconfigured by parameters stored in one or more memories. For example, a watermark calibration signal can be defined by parameters stored in a re-writable memory. By such arrangement, the same ASIC may be incorporated into two disparate devices, which employ different watermark calibration signals. One may be a point of sale scanner for reading watermark-encoded product identifiers hidden in grocery item packaging—which looks for a calibration signal comprised of one particular constellation of spatial frequency signals. A second may be an age verification terminal (e.g., at a liquor store) for reading watermark-encoded birthdate information hidden in a driver's license—which looks for a calibration signal comprised of a second, different constellation of spatial frequency signals. The chips are all identically produced in a single semiconductor fab, but are differentiated in their end-use by different calibration signal data stored in memory (which may be on-chip or off).

Yet another hybrid approach employs application-specific instruction set processors (ASIPS). ASIPS can be thought of as microprocessors. However, instead of having multipurpose native instruction sets, the instruction set is tailored—in the design stage, prior to fabrication—to a particular intended use. Thus, an ASIP may be designed to include native instructions that serve operations prevalent in a particular application (e.g., oct-axis computation). However, such native instruction set would typically lack certain of the instructions available in more general purpose microprocessors.

Reconfigurable hardware and ASIP arrangements are further detailed in application Ser. No. 14/842,575, filed Sep. 1, 2015 (now U.S. Pat. No. 9,819,950), the disclosure of which is incorporated herein by reference.

Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network.

Different of the functionality can be implemented on different devices. Thus, it should be understood that description of an operation as being performed by a particular device (e.g., a smartphone) is not limiting but exemplary; performance of the operation by another device (e.g., a cloud computer), or shared between devices, is also expressly contemplated.

In like fashion, description of data being stored on a particular device is also exemplary; data can be stored anywhere: local device, remote device, in the cloud, distributed, etc.

In addition to the patent documents referenced elsewhere, details concerning watermarking are known from applicant's U.S. Pat. Nos. 6,122,403, 6,345,104, 6,424,725, 6,516,079, 6,590,996, 6,912,295, 6,988,202, 7,013,021, 7,076,082, 7,231,061, 7,978,875, 7,574,014, 7,013,021 and 6,442,284, 20100150434, 20120078989, 20120129574, 20140052555, 20140304122, 20150278980, and 20160063611, and pending application Ser. No. 14/725,399, filed May 29, 2015 (now published as 20160275639). Such watermarks are commonly imperceptible, meaning they are not noticeable to a viewer examining watermarked objects from a typical viewing distance (e.g., 20 inches) under customary office or retail lighting.

Linking from watermarks (or other identifiers) to corresponding online payoffs is detailed, e.g., in Digimarc's U.S. Pat. Nos. 6,947,571 and 7,206,820.

Arrangements for identifying regions within captured imagery that have higher probabilities of watermark detection are detailed in U.S. Pat. Nos. 6,442,284, 6,516,079 7,013,021 and 20150030201.

As indicated, the present technology can be used in connection with wearable computing systems, including headworn devices. Such devices typically include one or more sensors (e.g., microphone(s), camera(s), accelerometers(s), etc.), and display technology by which computer information can be viewed by the user—either overlaid on the scene in front of the user (sometimes termed augmented reality), or blocking that scene (sometimes termed virtual reality), or simply in the user's peripheral vision. A headworn device may further include sensors for detecting electrical or magnetic activity from or near the face and scalp, such as EEG and EMG, and myoelectric signals—sometimes termed Brain Computer Interfaces, or BCIs. (A simple example of a BCI is the Mindwave Mobile product by NeuroSky, Inc.) Exemplary wearable technology is detailed in U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems.

Reference was made to context. The artisan will understand that context refers to any information useful in characterizing the situation of an entity (an entity being a person, place or object that is considered relevant to an interaction between a user and an application, including the user and application themselves).

Context information can be of many sorts, including computing context (network connectivity, resource availability, processor type, CPU contention, etc.), user context (user profile, location, actions, preferences, nearby friends, social network(s) and situation, etc.), physical context (e.g., lighting, noise level, traffic, sensed sounds, recognized speech, etc.), temporal context (time of day, day, month, season, etc.), history of the above, etc.

Another taxonomy of context progresses from simple and concrete, to complex and abstract, starting with location, then physical context (as determined by sensors, e.g., device orientation and motion, temperature, infrared, video, 3D ambient audio, ultrasonic, humidity, gases and other chemical), then user or device actions (e.g., writing, talking, reading, searching, navigating, pointing), then proximities (e.g., to people, vehicles, buildings, perimeters, jurisdictions, other devices), then somatic (e.g., live datastreams of biometric information), then data feeds (e.g., subscriptions and RSS feeds, social network follows, alerts and updates), then emergent live data (e.g., from external sources, such as calls, text, email, weather forecasts), and finally n-dimensional context history—encompassing some or all of the foregoing. Context arrangements suitable for use with the present technology are further detailed in the documents incorporated by reference.

This specification has discussed several different embodiments. It should be understood that the methods, elements and concepts detailed in connection with one embodiment can be combined with the methods, elements and concepts detailed in connection with other embodiments. While some such arrangements have been particularly described, some have not—due to the large number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

Mobile device software app used to capture screen imagery, and extract payload information, can be based on applicant's Discover app. This app uses technology detailed, e.g., in patent publications 20110212717, 20110161076, 20120208592, 20130311329, 20140052555, 20140357312 and 20150016712.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

The invention claimed is:

1. A watermark decoding method comprising the acts:
obtaining first and second images of a scene captured by a camera, the scene depicting an object having a digital watermark pattern printed thereon, the first image having a first resolution, and the second image having a second resolution less than the first resolution;
interpolating the second image to produce a third image having the first resolution;
subtracting the third image from the first image to yield a fourth, difference image; and
applying a watermark decoding process to data consisting of said fourth image, to yield a plural-bit watermark payload earlier encoded in said object;
wherein said first and second images are gathered in a single exposure, during which light is directed onto a single imaging sensor via a single optic path.

2. An image processing method comprising the acts:
through an API of a device operating system, instructing a device camera to capture a first single exposure of a scene, the scene including an object, the object having artwork printed thereon, the artwork having been encoded to steganographically convey a digital watermark payload, said single exposure being characterized by collection of light directed onto a single image sensor during a single light collection interval;
through said API, also directing first and second different versions of said single exposure to be stored in first and second memories, respectively; and
processing data stored in both the first and second memories in extracting said steganographic digital watermark payload from the scene.

3. The method of claim 2 that includes:
determining a difference image frame based on said first and second different versions of the single exposure; and
applying a watermark decoding process to said difference image frame to extract said payload.

4. The method of claim 2 that includes, through said API, directing that the first version of said single exposure, stored in the first memory, be of smaller pixel dimensions than the second version, stored in the second memory.

5. The method of claim 4 that includes:
processing the first version of said exposure to produce a third version, the third version of said exposure having pixel dimensions matching the second version of said exposure;
subtracting one of said second or third versions from the other, to determine a difference frame; and
applying a watermark decoding process to an image based on said difference frame to extract said payload.

6. The method of claim 4 that includes applying a watermark decoding process to the first version of the exposure, and applying a watermark decoding process to the second version of the exposure, to determine if a watermark is captured in one of said versions at a resolution that can be decoded.

7. The method of claim 2 that includes:
through said API, directing that the first version of said single exposure, but not the second version, be de-noised prior to storage; and
subtracting one of said versions from the other, to determine a difference frame; and
applying a watermark decoding process to an image based on said difference frame to extract said payload.

8. The method of claim 2 that further includes:
through said API: (a) instructing the device camera to capture a second exposure of said scene, and (b) directing first and second different versions of said second exposure to be stored in third and fourth memories, respectively, said first and second exposures of the scene being captured within 0.5 seconds of each other;
determining a first difference frame based on the versions of the first exposure stored in the first and second memories;
determining a second difference frame based on the versions of the second exposure stored in the third and fourth memories;
applying a watermark decoding process to an image based on the first difference frame; and
applying a watermark decoding process to an image based on the second difference frame.

9. The method of claim 8 that includes, through said API, directing that the first version of said first exposure, stored in the first memory, be of smaller pixel dimensions than the second version of said first exposure, stored in the second memory.

10. An imaging system comprising:
a camera having an image sensor;
a processor; and
a memory;
wherein the memory contains software that causes the system to perform acts including:
instructing the camera to capture a first single exposure of a scene, said single exposure being characterized by collection of light directed onto said image sensor during a single light collection interval;
directing first and second different versions of said single exposure to be stored separately in said memory; and
processing the first and second different versions of said single exposure, stored separately in said memory, in extracting a steganographic digital watermark payload from a depiction of an object printed with a digital watermark, included in the camera-captured scene.

11. The imaging system of claim 10 in which said software causes the system to perform acts including:
determining a difference image frame based on said first and second different versions of the single exposure; and
applying a watermark decoding process to said difference image frame to extract said payload.

12. The imaging system of claim 10 in which said software causes the system to direct that the first version of said single exposure, stored in the first memory, be of smaller pixel dimensions than the second version, stored in the second memory.

13. The imaging system of claim 12 in which said software causes the system to perform acts including:
processing the first version of said exposure to produce a third version, the third version of said exposure having pixel dimensions matching the second version of said exposure;
subtracting one of said second or third versions from the other, to determine a difference frame; and
applying a watermark decoding process to an image based on said difference frame to extract said payload.

14. The imaging system of claim 12 in which said software causes the system to perform acts including: applying a watermark decoding process to the first version of the exposure, and applying a watermark decoding process to the second version of the exposure, to determine if a watermark is captured in one of said versions at a resolution that can be decoded.

15. The imaging system of claim 10 in which said software causes the system to perform acts including:
directing that the first version of said single exposure, but not the second version, be de-noised prior to storage;

subtracting one of said versions from the other, to determine a difference frame;

and applying a watermark decoding process to an image based on said difference frame, to extract said payload.

16. The imaging system of claim 10 in which said software causes the system to perform acts including:

(a) instructing the camera to capture a second exposure of said scene, and (b) directing first and second different versions of said second exposure to be stored in third and fourth memories, respectively, said first and second exposures of the scene being captured within 0.5 seconds of each other;

determining a first difference frame based on the versions of the first exposure stored in the first and second memories;

determining a second difference frame based on the versions of the second exposure stored in the third and fourth memories;

applying a watermark decoding process to an image based on the first difference frame; and applying a watermark decoding process to an image based on the second difference frame.

17. The imaging system of claim 16 in which the first version of said first exposure, stored in the first memory, is of smaller pixel dimensions than the second version of said first exposure, stored in the second memory.

18. The imaging system of claim 16 in which said software causes the system to perform de-noising of the first version of said first exposure, but not the second version of the first exposure, prior to storage.

19. The imaging system of claim 10 in which said software causes the system to perform acts including:

receiving distance information, indicating a distance between the image sensor and the scene; and scaling the captured exposure by a correction factor corresponding to said distance information.

20. An imaging system comprising:

a memory;

a camera, including an image sensor, to capture a first single exposure of a scene, said single exposure being characterized by collection of light directed onto said image sensor during a single light collection interval;

first means for directing first and second different versions of said single exposure to be stored separately in said memory; and second means for processing the first and second different versions of said single exposure, stored separately in said memory, in extracting a steganographic digital watermark payload from a depiction of an object printed with a digital watermark, included in the camera-captured scene.

* * * * *